United States Patent
Mani et al.

(10) Patent No.: US 12,493,515 B2
(45) Date of Patent: Dec. 9, 2025

(54) MICROCONTROLLER FIRMWARE CRASH RECOVERY

(71) Applicant: DELL PRODUCTS L.P., Round Rock, TX (US)

(72) Inventors: Pandiyarajan Mani, Gudiyattam (IN); Veena Ramarao, Bangalore (IN); Vinoth Raja P, Thiruvarur (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/622,328

(22) Filed: Mar. 29, 2024

(65) Prior Publication Data

US 2025/0307066 A1    Oct. 2, 2025

(51) Int. Cl.
G06F 11/07 (2006.01)
G06F 11/30 (2006.01)

(52) U.S. Cl.
CPC ...... G06F 11/0793 (2013.01); G06F 11/0709 (2013.01); *G06F 11/3058* (2013.01)

(58) Field of Classification Search
CPC ............. G06F 11/0706; G06F 11/0793; G06F 11/3058; G06F 11/0709
See application file for complete search history.

(56) References Cited

U.S. PATENT DOCUMENTS

| | | | |
|---|---|---|---|
| 11,093,321 B1 * | 8/2021 | Zeavelou | G06F 11/0793 |
| 11,226,862 B1 * | 1/2022 | Lambert | G06F 1/30 |
| 11,836,100 B1 | 12/2023 | Bolen et al. | |
| 12,248,302 B2 * | 3/2025 | Gerhart | G06F 1/20 |
| 12,267,981 B2 * | 4/2025 | Gerhart | H05K 7/20 |
| 2023/0229206 A1 | 7/2023 | Tunks et al. | |

* cited by examiner

*Primary Examiner* — Joseph R Kudirka
(74) *Attorney, Agent, or Firm* — Larson Newman, LLP

(57) ABSTRACT

If microcontroller firmware is corrupted, then an information handling system checks an inlet temperature. If the inlet temperature is within a temperature range, then the system powers on a baseboard management controller and recovers the microcontroller firmware.

20 Claims, 4 Drawing Sheets

MICROCONTROLLER FIRMWARE CRASH RECOVERY

FIELD OF THE DISCLOSURE

The present disclosure generally relates to information handling systems, and more particularly relates to microcontroller firmware crash recovery.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

If microcontroller firmware is corrupted, then an information handling system checks an inlet temperature. If the inlet temperature is within a temperature range, then the system powers on a baseboard management controller and recovers the microcontroller firmware.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
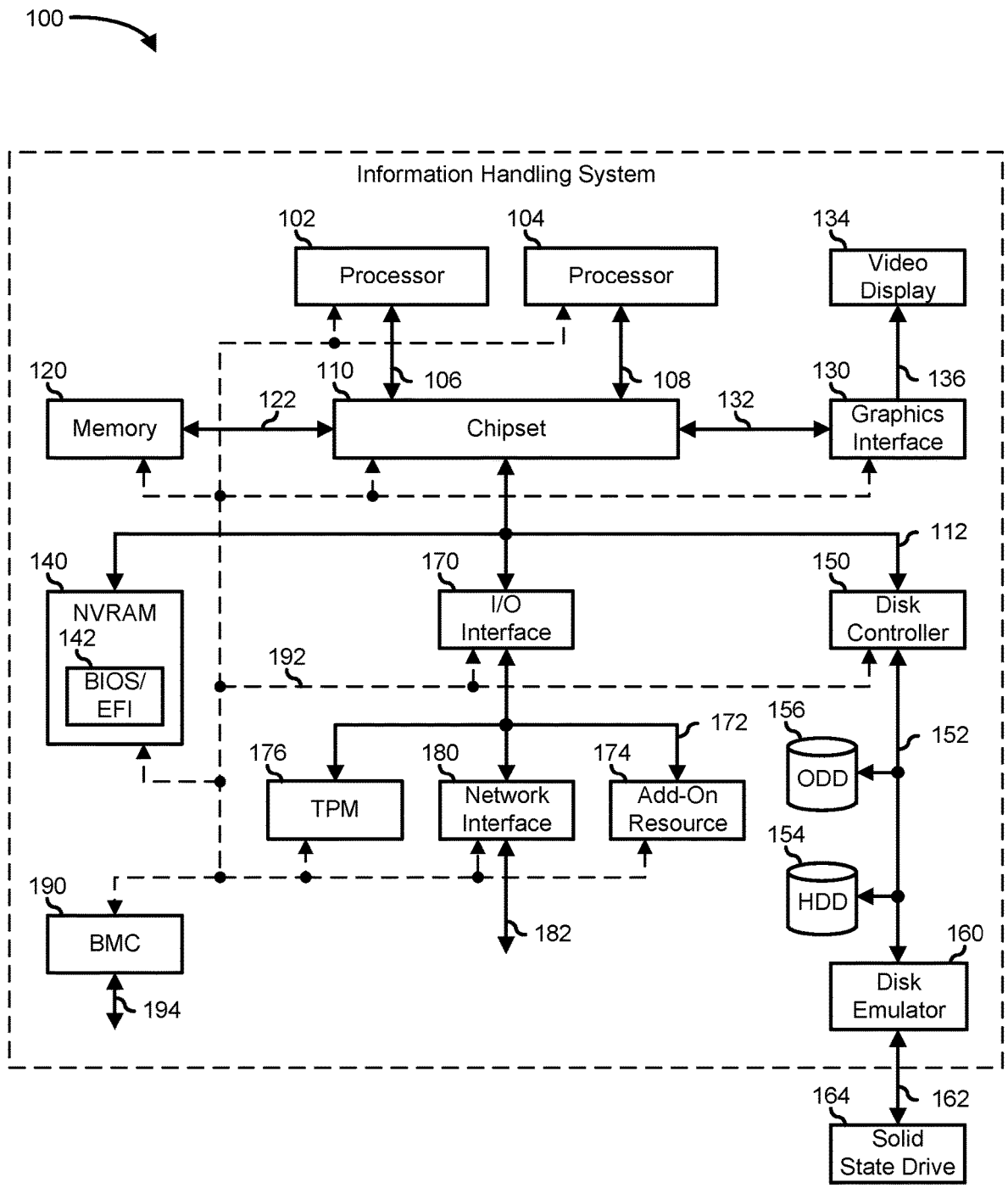
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NVRAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (x4) PCIe adapter, an eight-lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NVRAM 140, disk controller 150, and I/O interface 170 are connected to chipset 110 via an I/O channel 112. An example of I/O channel 112 includes one or more point-to-point PCIe links between chipset 110 and each of NVRAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit (I²C) interface, a System Packet Interface, a Universal Serial Bus (USB), another interface, or a combination thereof. NVRAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board, or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172 and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device, a BMC may be referred to as an embedded controller (EC). A BMC included in a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, and transfers the firmware updates to the NVRAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Enterprise, a Dell EMC OpenManage Server Administrator (OMSA) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NVRAM associated with the BMC. Information stored in the RAM may be lost after power-down of the power plane for BMC 190, while information stored in the NVRAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

For servers that are designed to operate in cold weather conditions, an integrated heater pad may be used to elevate an inlet temperature to a minimum level required to power on the server. For instance certain data centers are located in exceptionally cold environments, with temperatures ranging from −25° C. to −15° C. In such scenarios if the inlet temperature falls below or equals −5° C., then the server will not be able to power on. Therefore these heater pads are typically engineered to raise the server components' temperature within a temperature range of −5° C. to 55° C., to allow the server to boot.

Typically, a firmware installed on a microcontroller (MCU) to manage and/or control the heater pads may be configured to maintain the temperature of the server to be within the aforementioned bootable temperature range. However when the firmware becomes corrupted and/or crashes, a server BMC generally lacks the capability to boot the server, such as from an S6 power state to an S5 power state. The S6 power state is a custom sleep state that provides various auxiliary power rails to support the BMC boot-first processes. When the server is at the S5 power state, the server is in a shutdown or off state but with the BMC booted.

When the server BMC fails to boot, service engineers may have to physically visit the server's location to enable a debug option, facilitating the BMC to power on. This becomes a significant challenge due to the remote and harsh environmental conditions in which these servers are deployed, resulting in substantial costs and difficulties for support engineers. To address these and other concerns, the present disclosure provides a system and method for MCU firmware recovery and power on the server BMC.

Figure 2:
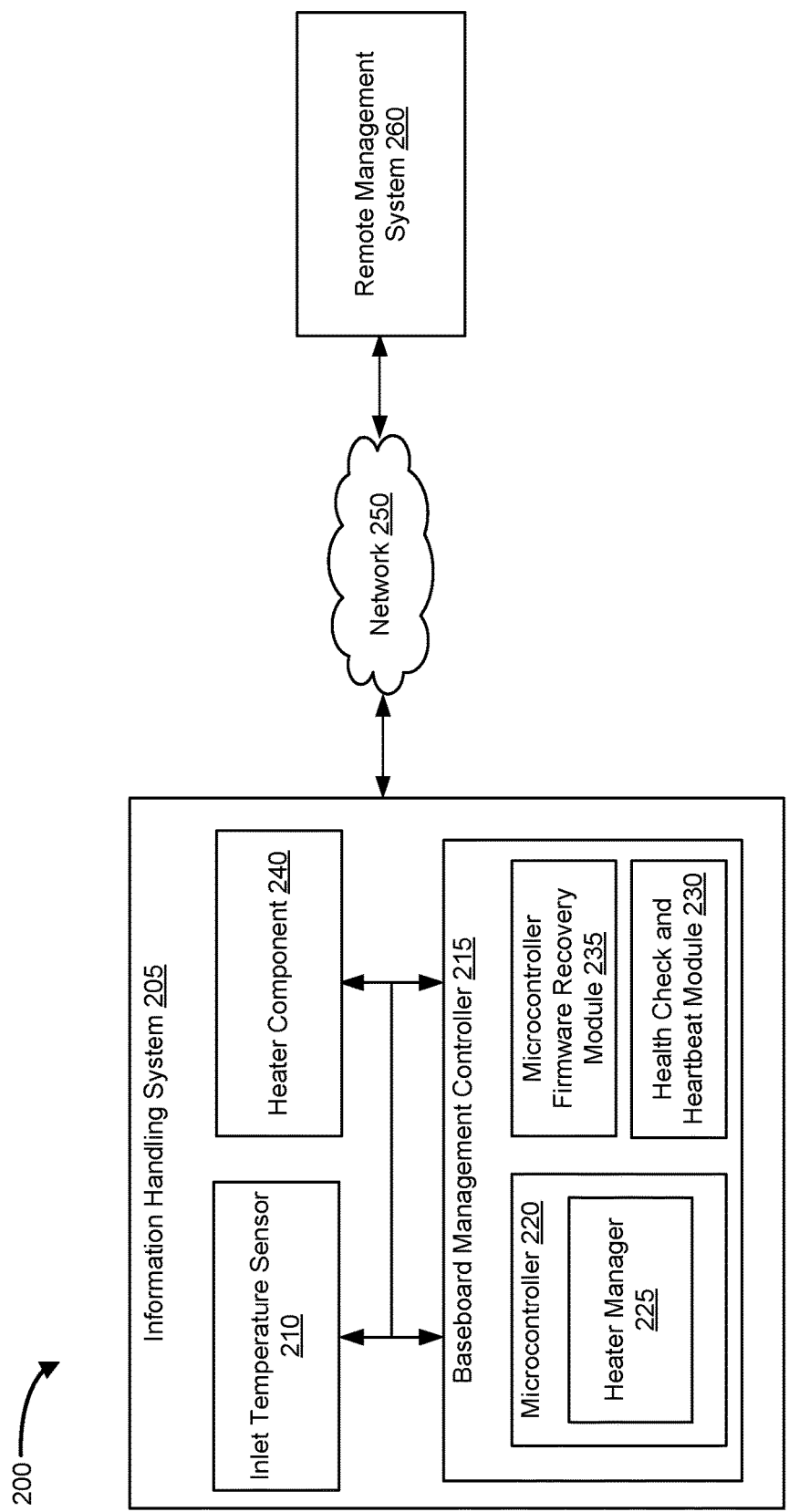
FIG. 2 is a block diagram of a system for microcontroller firmware crash recovery, according to an embodiment of the present disclosure.

FIG. 2 shows system 200 for a microcontroller firmware crash recovery. System 200 includes an information handling system 205, a network 250, and a remote management system 260. Information handling system 205, which is similar to information handling system 100 of FIG. 1, includes an inlet temperature sensor 210, a BMC 215, and a heater component 240. BMC 215, which is similar to BMC 190 of FIG. 1, includes an MCU 220, a health check and heartbeat module (HCHM) 230, and an MCU firmware recovery module 235. MCU 220 further includes a heater manager 225. BMC 215 may be communicatively coupled to inlet temperature sensor 210 and heater component 240. Information handling system 205 may be communicatively coupled to remote management system 260 via network 250. However, any variety of connections between the aforementioned components of information handling system 205 and of information handling system 205 with remote management system 260 are envisioned as falling within the scope of the present disclosure. The components of system 200 may be implemented in hardware, software, firmware, or any combination thereof. The components shown are not drawn to scale and system 200 may include additional or fewer components. In addition, connections between components may be omitted for descriptive clarity.

Inlet temperature sensor 210 may be located proximate to an inlet of information handling system 205. Thus, inlet temperature sensor 210 may be configured to measure the temperature of the air entering the inlet. This temperature may be used by BMC 215 to represent the ambient temperature of information handling system 205. In addition to monitoring the inlet temperature, inlet temperature sensor 210 may also be used to monitor the temperature of one or more components of information handling system 205.

Heater component 240 may be made of polyimide film, silicon rubber, any other material, and/or any combination thereof that enables heater component 240 to perform its functions. For example, heater component 240 may be configured to be used in maintaining the temperature of information handling system 205 within the temperature range of around −5° C. to 55° C. In one embodiment, heater component 240 may be integrated into another component or disposed between insulator components. In another embodiment, heater component 240 may be included in a heater apparatus or a heater pad.

Heater manager 225 may be a firmware in MCU 220 and may be used to manage, control, and/or monitor one or more heater pads or heater components, such as heater component 240. In one embodiment, heater manager 225 may be a daemon that runs as a background process while performing its functions. For example, heater manager 225 may continue to function even if information handling system 205 is in an S6 power state. MCU 220 may include a memory and a processor that may be used to store and execute heater manager 225 respectively according to firmware requirements.

HCHM 230 may be configured to manage, control, and monitor the health and status of heater manager 225. HCHM 230 may use a set of criteria to determine whether heater manager 225 is healthy or unhealthy. However, one of skill in the art will appreciate that a criterion may be added or removed from the set of criteria used in determining whether heater manager 225 is healthy or unhealthy. In one example, HCHM 230 may use a heartbeat mechanism via one or more IPMI commands. The heartbeat mechanism may be used to perform health checks on heater manager 225. For a particular example, HCHM 230 may send a heartbeat message, such as a pulse or a packet, to heater manager 225 to confirm that it is alive or healthy, such as functioning.

The heartbeat message may be transmitted at a regular interval based on a preferred timing by BMC 215 and/or a system administrator. For example, the heartbeat message may be transmitted periodically every 5 seconds, 3 seconds, and the like. If, however, no heartbeat message response is received over an elapsed period, such as longer than the heartbeat interval, then HCHM 230 may send another heartbeat message up to a predetermined threshold before HCHM 230 may perform another action. For example, HCHM 230 may send three heartbeat messages without a heartbeat message response before HCHM 230 may request a reset of heater manager 225. HCHM 230 may then also send another heartbeat message. At this point, if heater manager 225 still does not respond, HCHM 230 may determine that heater manager 225 is in an unhealthy state, such that heater manager 225 may be corrupted or has crashed.

If heater manager 225 is deemed to be in an unhealthy state, then HCHM 230 may activate MCU firmware recovery module 235. For example, HCHM 230 may load MCU firmware recovery module 235. Once activated, MCU firmware recovery module 235 may initiate a recovery process of heater manager 225. The recovery process may include MCU firmware recovery module 235 checking the server's inlet temperature instead of a typical approach of checking the temperature of heater manager 225. If the inlet temperature falls within the operational range, irrespective of the status of heater manager 225 and/or heater component 240, MCU firmware recovery module 235 may power on BMC 215 or set it to active mode. This allows BMC 215 to have the ability to detect and respond to a corruption or a crash of heater manager 225 without the need for a support engineer to physically power on BMC 215 or set it to active mode. BMC 215 may be in an active mode if it is not inhibited from performing any of its functions.

For example, BMC 215 may automatically update, reprogram, and/or recover heater manager 225 based on a set of criteria. For example, if the firmware version of heater manager 225 is not the latest version, then BMC 215 may update the firmware version of heater manager 225. However, one of skill in the art will appreciate that a criterion may be added or removed from the set of criteria used in determining whether to update, re-program, or recover heater manager 225. In another example, if the firmware is the latest version, then BMC 215 may recover the firmware. In another embodiment, a support engineer may log in to remote management system 260 and connect to BMC 215 to update, re-program, and/or recover heater manager 225. In addition, BMC 215 may collect or receive logs from MCU firmware recovery module 235, heater manager 225, and HCHM 230. The logs can be used to assist the support engineer in debugging the issue.

BMC 215 may be configured to support the IPMI specification that allows BMC 215 with remote management capabilities and power control functions via remote management system 260. Accordingly, remote management system 260 may be used to remotely connect to BMC 215 to recover or upgrade the firmware, heater manager 225 through network 250. In one embodiment, MCU firmware recovery module 235 may be a firmware implemented within a thermal daemon that can read inlet temperature via inlet temperature sensor 210 even if information handling system 205 is in the S6 power state. However, one of skill in the art will appreciate that MCU firmware recovery module 235 may be implemented separately or within any suitable software application without departing from the principles herein.

Network 250 may be implemented as or may be a part of, a storage area network (SAN), a personal area network (PAN), a local area network (LAN), a metropolitan area network (MAN), a wide area network (WAN), a wireless local area network (WLAN), a virtual private network (VPN), an intranet, the Internet, or any other appropriate architecture or system that facilitates the communication of signals, data and/or messages. Network 250 may transmit data using any storage and/or communication protocol, including without limitation, Fibre Channel, Frame Relay, Asynchronous Transfer Mode (ATM), Internet Protocol (IP), other packet-based protocol, SCSI, Internet SCSI (iSCSI), Serial Attached SCSI (SAS), or any other transport that operates with the SCSI protocol, ATA, SATA, advanced technology attachment packet interface (ATAPI), serial storage architecture (SSA), integrated drive electronics (IDE), and/or any combination thereof. Network 250 and its various components may be implemented using hardware, software, or any combination thereof. These components may be configured to facilitate communication between information handling system 205 and remote management system 260.

Those of ordinary skill in the art will appreciate that the configuration, hardware, and/or software components of system 200 depicted in FIG. 2 may vary. For example, the illustrative components within system 200 are not intended to be exhaustive but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

Figure 3:
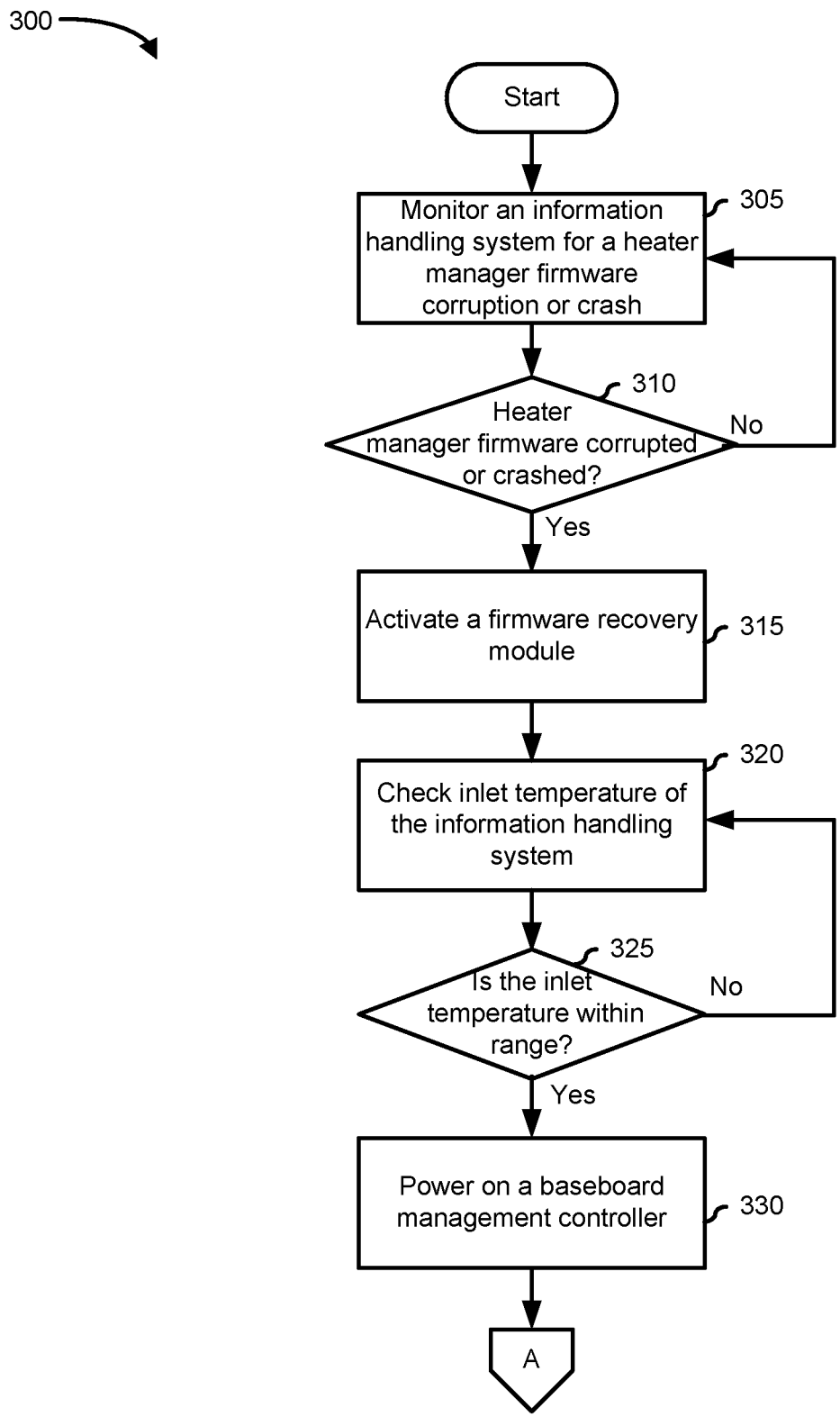
FIGS. 3-4 are flowcharts of a method for microcontroller firmware crash recovery, according to an embodiment of the present disclosure.

FIG. 3 shows a flowchart of a method 300 for microcontroller firmware crash recovery. Method 300 may be performed by any suitable component of system 200 including, but not limited to, BMC 215, heater manager 225, HCHM 230, and MCU firmware recovery module 235 of FIG. 2. While embodiments of the present disclosure are described in terms of the components of system 200 of FIG. 2, it should be recognized that other components may be utilized to perform the described method. One of skill in the art will appreciate that this sequence diagram explains a typical example, which can be extended to applications or services in practice.

Method 300 typically starts at block 305 where HCHM 230 may monitor information handling system 205 to detect whether heater manager 220 has crashed or is corrupted. HCHM 230 may be configured to detect and/or identify when heater manager 225 crashes or becomes corrupted, which may trigger activation of MCU firmware recovery module 235 and initiate a recovery process. BMC 215 may determine that the firmware heater manager 225 crashed based on a set of criteria. For example, HCHM 230 may detect that heater manager 220 has crashed if heater manager 220 has not responded to one or more I²C communication attempts. HCHM 230 may also detect whether heater manager 220 has crashed if heater manager 220 has not responded to a reset request by HCHM 230. A threshold on the number of I²C communication attempts may be determined by a system administrator or BMC 215 may use a default threshold. In one particular example, the threshold for unresponsive I²C communication attempts may be set to three before BMC sends a reset request. In addition, HCHM 230 may detect that heater manager 220 has crashed if HCHM 230 has identified one or more fatal errors associated with heater manager 225. The fatal errors may make heater manager 225 uncommunicative. At this point, BMC may be powered off or in a passive mode. The BMC may be in a passive mode if it is inhibited from performing certain operations. In addition, information handling system 205 may be in an S6 power state.

At decision block 310, HCHM 230 may determine whether heater manager 225 is corrupted or has crashed. If HCHM 230 determines that heater manager 225 is corrupted or has crashed, then the "YES" branch is taken and then the method proceeds to block 315. If HCHM 230 determines that heater manager 225 is not corrupted or has not crashed, then the "NO" branch is taken, and the method proceeds to block 305 where HCHM 230 may continue to monitor heater manager 225. At block 315, HCHM 230 may activate MCU firmware recovery module 235. In another embodiment, the crash or corruption of heater manager 225 may trigger the activation of MCU firmware recovery module 235. The method proceeds to block 320 where MCU firmware recovery module 235 may check the inlet temperature of information handling system 205 via inlet temperature sensor 210.

The method proceeds to decision block 325 where MCU firmware recovery module 235 may determine whether the inlet temperature is within the temperature range that allows the information handling system to be booted. For example, information handling system 205 can be booted if the current inlet temperature is within the range of −5° C. to 55° C. If the current inlet temperature is within the temperature range, then the "YES" branch is taken and then the method proceeds to block 330. If the current inlet temperature is not within the temperature range, then the "NO" branch is taken, and the method proceeds to block 320 to check the inlet temperature after a period of time. For example, MCU firmware recovery module 235 may wait five seconds before checking the inlet temperature again.

At block 330, MCU firmware recovery module 235 may power on BMC 215 by transitioning the power state of information handling system 205 from the S6 power state to an S5 power state. In another embodiment, MCU firmware recovery module 235 may transition BMC 215 from the passive mode to the active mode. MCU firmware recovery module 235 may be configured to power on BMC 215, despite the corruption or crash of heater manager 225. Thus, MCU firmware recovery module 235 may be configured to override the power state transition of information handling system 205. After the BMC is powered on, the method proceeds to block 410 of a method 400 of FIG. 4 which is a continuation of method 300.

Figure 4:
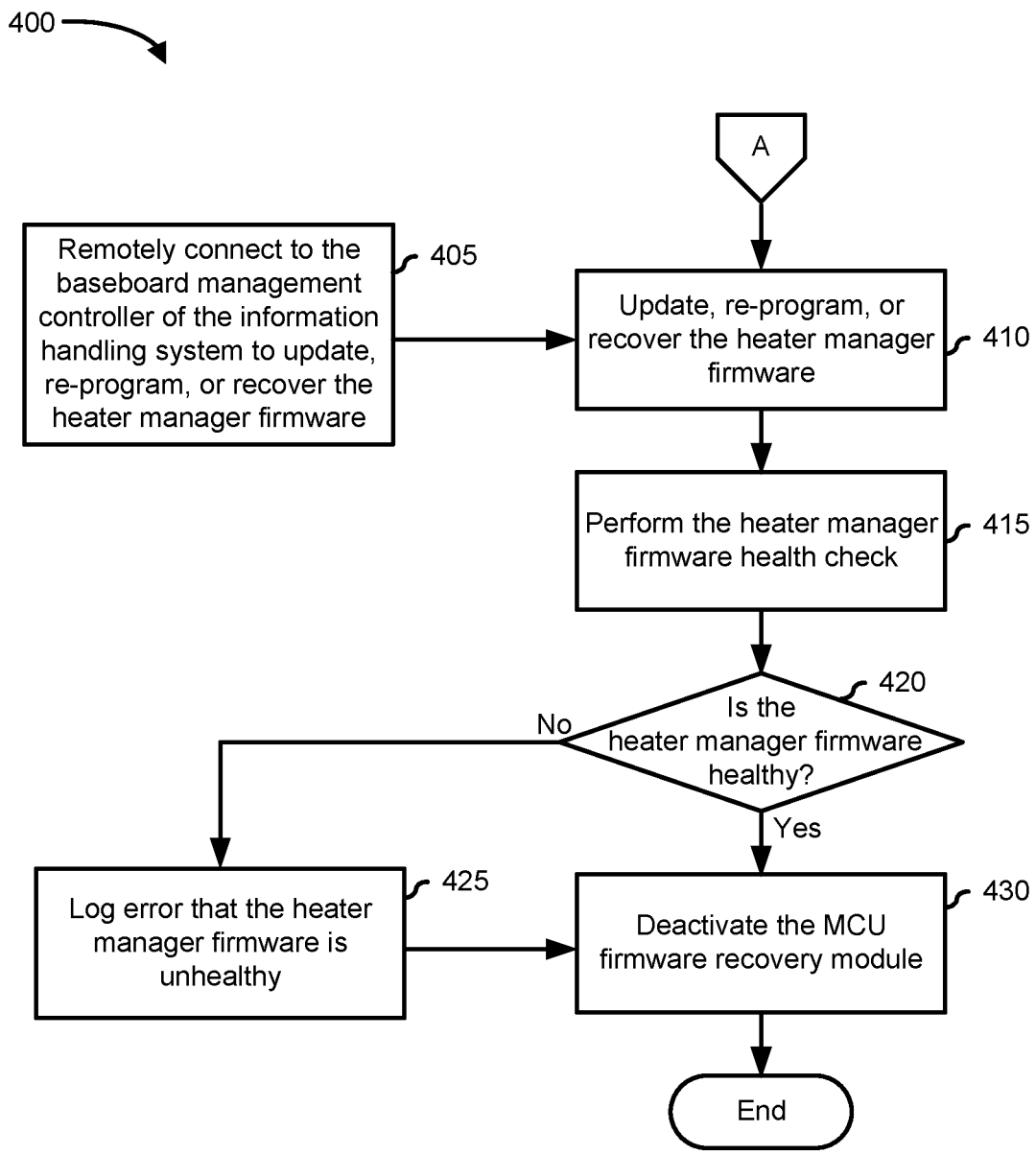

FIG. 4 shows a flowchart of method 400 for microcontroller firmware crash recovery. Method 400 may be performed by any suitable component of system 200 including, but not limited to, BMC 215, heater manager 225, HCHM 230, and MCU firmware recovery module 235 of FIG. 2. While embodiments of the present disclosure are described in terms of the components of system 200 of FIG. 2, it should be recognized that other components may be utilized to perform the described method. One of skill in the art will appreciate that this sequence diagram explains a typical example, which can be extended to applications or services in practice.

In one embodiment, a support engineer may remotely connect to BMC 215 of information handling system 205 to initiate the update, re-program, or recover heater manager 225 at block 405. At block 410, the firmware of heater manager 225 may be recovered or re-programmed. In another embodiment, BMC 215 may automatically initiate the update, re-program, or recovery of heater manager 225. The method proceeds to block 415, where BMC 215 may perform a health check on heater manager 225. In particular, HCHM 230 may perform a health check using the heartbeat mechanism via an IPMI command. Heater manager 225 may be healthy if it responds to the heartbeat message transmitted by HCHM 230.

The method proceeds to decision block 420 where BMC 215 and/or HCHM 230 may determine whether heater manager 225 is healthy. If heater manager 225 is healthy, then the "YES" branch is taken, and the method proceeds to block 430. If heater manager 225 is not healthy, then the "NO" branch is taken, and the method proceeds to block 425. At block 425, BMC 215 may log an error that heater manager 225 is unhealthy. BMC 215 may also log other information associated with heater manager 225. The method proceeds to block 430 where BMC 215 may deactivate MCU firmware recovery module 235. For example, BMC 215 may unload MCU firmware recovery module 235. Afterwards, the method ends.

Although FIG. 3, and FIG. 4 show example blocks of method 300 and method 400 in some implementations, method 300 and method 400 may include additional blocks, fewer blocks, different blocks, or differently arranged blocks than those depicted in FIG. 3 and FIG. 4. Those skilled in the art will understand that the principles presented herein may be implemented in any suitably arranged processing system. Additionally, or alternatively, two or more of the blocks of method 300 and method 400 may be performed in parallel. For example, block 315 and block 320 of method 300 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes, or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
   detecting, by an information handling system, whether microcontroller firmware has crashed;
   when the microcontroller firmware has crashed, then checking an inlet temperature of the information handling system; and
   when the inlet temperature of the information handling system is within a temperature range, then powering on a baseboard management controller and recovering the microcontroller firmware.

2. The method of claim 1, wherein the checking of the inlet temperature is performed while the information handling system is in an S6 power state.

3. The method of claim 1, wherein the powering on of the baseboard management controller includes transitioning the information handling system to an S5 power state.

4. The method of claim 1, wherein the microcontroller firmware is configured to manage a heater component.

5. The method of claim 1, further comprising determining whether the microcontroller firmware is healthy.

6. The method of claim 1, further comprising sending a heartbeat message to the microcontroller firmware.

7. The method of claim 6, further comprising if the microcontroller firmware responds to the heartbeat message, then deactivating a firmware for the recovering of the microcontroller firmware.

8. The method of claim 6, further comprising if the microcontroller firmware does not respond to the heartbeat message, then logging an error prior to deactivating a firmware for the recovering of the microcontroller firmware.

9. The method of claim 1, further comprising if the inlet temperature is not within the temperature range, then checking the inlet temperature after a period.

10. An information handling system, comprising:
    a processor; and
    a memory storing instructions that when executed cause the processor to perform operations including:
        detecting whether a microcontroller firmware is corrupted;
        when the microcontroller firmware is corrupted, then checking an inlet temperature of the information handling system; and
        when the inlet temperature of the information handling system is within a temperature range, then powering on a baseboard management controller and recovering the microcontroller firmware.

11. The information handling system of claim 10, wherein the powering on of the baseboard management controller includes transitioning the information handling system to an S5 power state.

12. The information handling system of claim 10, wherein the operations further comprise sending a heartbeat message to the microcontroller firmware.

13. The information handling system of claim 12, wherein the operations further comprise if the microcontroller firmware responds to the heartbeat message, then deactivating the baseboard management controller.

14. The information handling system of claim 12, wherein the operations further comprise if the microcontroller firmware does not respond to the heartbeat message, then logging an error prior to deactivating the baseboard management controller.

15. The information handling system of claim 10, wherein the operations further comprise if the inlet temperature is not within the temperature range, then checking the inlet temperature after a period.

16. A non-transitory computer-readable medium to store instructions that are executable to perform operations comprising:

when microcontroller firmware of an information handling system has crashed, then checking an inlet temperature of the information handling system; and when the inlet temperature of the information handling system is within a temperature range, then powering on a baseboard management controller and updating the microcontroller firmware.

17. The non-transitory computer-readable medium of claim 16, wherein the powering on of the baseboard management controller includes transitioning the information handling system to an S5 power state.

18. The non-transitory computer-readable medium of claim 16, wherein the operations further comprise if the microcontroller firmware responds to a heartbeat message, then deactivating the baseboard management controller.

19. The non-transitory computer-readable medium of claim 16, wherein the operations further comprise if the microcontroller firmware does not respond to a heartbeat message, then logging an error prior to deactivating the baseboard management controller.

20. The non-transitory computer-readable medium of claim 16, wherein the operations further comprise if the inlet temperature is not within the temperature range, then checking the inlet temperature after a period.

* * * * *